(12) United States Patent
Park

(10) Patent No.: US 11,349,282 B2
(45) Date of Patent: May 31, 2022

(54) HIGH VOLTAGE ELECTRIC SWITCHBOARD

(71) Applicant: LSIS CO., LTD., Anyang-si (KR)

(72) Inventor: Yongjun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/572,118

(22) Filed: Sep. 16, 2019

(65) Prior Publication Data

US 2020/0099201 A1 Mar. 26, 2020

(30) Foreign Application Priority Data

Sep. 21, 2018 (KR) ........................ 20-2018-0004426

(51) Int. Cl.
*H02B 1/04* (2006.01)
*H02B 1/044* (2006.01)
*H02B 11/10* (2006.01)
*H02B 11/167* (2006.01)

(52) U.S. Cl.
CPC ............. *H02B 11/10* (2013.01); *H02B 1/042* (2013.01); *H02B 1/044* (2013.01); *H02B 11/167* (2013.01)

(58) Field of Classification Search
CPC ........ H02B 11/10; H02B 1/042; H02B 1/044; H02B 11/167
USPC ................................................. 361/605, 608
See application file for complete search history.

(56) References Cited

U.S. PATENT DOCUMENTS

| 1,869,856 | A | * | 8/1932 | Macneil | H02B 11/00 361/607 |
| 1,953,822 | A | * | 4/1934 | Reed | H02B 11/173 361/607 |
| 2,673,260 | A | * | 3/1954 | Lester | H02B 11/133 200/50.26 |
| 2,858,389 | A | * | 10/1958 | Cuoratojohnj | H02B 11/04 200/50.26 |
| 3,437,768 | A | * | 4/1969 | Miller | H01H 9/0066 200/50.23 |

(Continued)

FOREIGN PATENT DOCUMENTS

| CN | 101034792 A | 9/2007 |
| CN | 102820164 A | 12/2012 |

(Continued)

OTHER PUBLICATIONS

Chinese Notice of Allowance for related Chinese Application No. 201910899053.4; action dated Oct. 19, 2021; (7 pages).

*Primary Examiner* — Anatoly Vortman
(74) *Attorney, Agent, or Firm* — K&L Gates LLP

(57) ABSTRACT

A high voltage electric switchboard in which manufacturing productivity is greatly improved and each functional part can be easily replaced and repaired is provided. In the high voltage electric switchboard, a plurality of functional parts including a bus bar part, a measurement and supervisory controller, a circuit breaker part, a wire part, and potential transformer part are independently modularized such that the functional parts do not have a shared surface with each other and at least two outer surfaces of an enclosure of each of the modularized functional parts are installed to be in contact with an outer surface of an enclosure of another functional part adjacent in a horizontal direction or a vertical direction.

2 Claims, 14 Drawing Sheets

(56) References Cited

U.S. PATENT DOCUMENTS

| | | | | |
|---|---|---|---|---|
| 4,236,189 A * | 11/1980 | Yosida | ............... | H02B 11/10 |
| | | | | 200/50.26 |
| 7,022,923 B2 * | 4/2006 | Liebetruth | ........... | H02B 11/133 |
| | | | | 200/50.21 |
| 8,648,271 B2 * | 2/2014 | Kim | ..................... | H01H 3/16 |
| | | | | 200/332.1 |
| 9,972,458 B2 * | 5/2018 | Lee | ..................... | H02B 11/10 |
| 2004/0020753 A1 * | 2/2004 | Liebetruth | ........... | H02B 11/133 |
| | | | | 200/50.21 |
| 2010/0236905 A1 * | 9/2010 | Capelli | ............... | H02B 11/127 |
| | | | | 200/50.24 |

FOREIGN PATENT DOCUMENTS

| | | |
|---|---|---|
| JP | 2012249429 A | 12/2012 |
| KR | 1020110117959 | 10/2011 |
| KR | 101201711 B1 | 11/2012 |
| KR | 101220855 | 1/2013 |
| KR | 20170101668 A | 9/2017 |

\* cited by examiner

HIGH VOLTAGE ELECTRIC SWITCHBOARD

CROSS-REFERENCE TO RELATED APPLICATION

Pursuant to 35 U.S.C. § 119(a), this application claims the benefit of earlier filing date and right of priority to Korean Utility Model Application No. 20-2018-0004426, filed on Sep. 21, 2018, the contents of which is incorporated by reference herein in its entirety.

BACKGROUND OF THE DISCLOSURE

1. Field of the Disclosure

The present disclosure relates a high voltage electric switchboard which is simple to install and maintain.

2. Background of the Disclosure

As can be seen from FIG. 1 showing structural characteristics of a high voltage electric switchboard according to a related art, in a high voltage electric switchboard 100 according to the related art, a circuit breaker part 1 and a potential transformer part (PT part) are divided up and down by an intermediate diaphragm 3, but these circuit breaker part 1 and the potential transformer part 2 share the intermediate diaphragm 3 as a lower surface and an upper surface and a side plate 4 coupled to the side of the circuit breaker part 1 and the potential transformer part 2 are also shared by the circuit breaker part 1 and the potential transformer part 2, and a plurality of functional parts are divided in region in a single room. Other functional parts that are not shown or not given a reference numeral are also configured to share one surface with functional parts adjacent in a horizontal or vertical direction.

Therefore, according to the related art, it is impossible to separately manufacture and assemble each of the functional parts of the high voltage electric switchboard 100.

In addition, in the high voltage electric switchboard 100 according to the related art, if a specific functional part has a fault, it is impossible to separate only the corresponding functional part to replace and repair it.

Also, as to the circuit breaker part 1, an installation structure of a mechanism operated cell (MOC) switch of the high voltage electric switchboard 100 according to the related art, where the MOC switch outputs a position detection signal according to a connected position in which a terminal of a circuit breaker main body (not shown) is connected to a terminal part for connection with an external power circuit, a test position in which the terminal is separated from the connection terminal part but supplied with control power for testing, or a disconnected position in which the terminal is separated from the connection terminal part and separated from the control power for testing, has the following problems.

The MOC switch of the high voltage electric switchboard according to the related art is installed directly under an opening portion provided in the intermediate diaphragm 3 and operated according to whether a striker (not shown) installed in a transfer cart is pressed according to a position of the circuit breaker main body loaded in the transfer cart and moved.

As can be seen from FIG. 2 or 3, in an MOC switch 5 of the high voltage electric switchboard according to the related art, a fixing bracket 5a fixed to the intermediate diaphragm 3 to support the MOC switch 5 has a lying longitudinal cross-sectional shape of the "C" type so as to be fastened and fixed by inserting and fixing a bolt (or screw) from the bottom of the intermediate diaphragm 3.

Therefore, two operators are required to fix the MOC switch 5 to the intermediate diaphragm 3 of the high voltage electric switchboard according to the related art. That is, one must hold the MOC switch 5 by hand through the opening portion from an upper portion of the intermediate diaphragm 3 of the high voltage electric switchboard according to the related art, and the other one must insert and fasten the bolt (or screw) upward through a fixing screw hole 5a1 of the fixing bracket 5a from a lower portion of the intermediate diaphragm 3.

A horizontal width of the high voltage electric switchboard according to the related art is only about 600 mm and a front-rear length of the high voltage electric switchboard is only about 1000 mm, and since the operator must at least partially enter the inside of the corresponding high voltage electric switchboard 100 to perform the installation work as described above, the installation work is very inconvenient. In addition, in the high voltage electric switchboard 100 according to the related art, if the MOC switch is required to be replaced or repaired due to a failure or a defective operation, a working space is not present due to the already installed components (for example, the transfer cart, the circuit breaker main body, the potential transformer, etc.) of the circuit breaker part 1 and the PT part 2, and thus, working is more difficult.

In FIGS. 2 and 3, reference numeral 5b indicates a power receiving rod that receives pressing power of the striker, reference numeral 5c indicates a return spring for applying an elastic force to the power receiving rod 5b to return to its original position, reference numeral 5d indicates an "L"-shaped operating plate connected to the power receiving rod 5b so as to be movable in the same direction together and pressing an operating lever (not shown) of a micro-switch 5e to open and close an internal switch of the micro-switch 5e to send or stop a position detection signal, and reference numeral 5e indicates the micro-switch sending or stopping the position detection signal according to whether the operating lever is pressed by a lower end portion of the operating plate 5d.

A more detailed description and illustration of the configuration and operation of the MOC switch may refer to the following patent document given to the applicant of the present application.
(Patent document 1) KR10-1220855 B1

SUMMARY OF THE DISCLOSURE

Therefore, an aspect of the detailed description is to provide a high voltage electric switchboard in which a plurality of functional parts constituting the high voltage electric switchboard are configured as independent modules that do not have a shared surface and manufactured in parallel, whereby manufacturing productivity are greatly improved and each functional part can be easily replaced and repaired.

Another aspect of the detailed description is to provide a high voltage electric switchboard having a mechanism operated cell (MOC) switch which can be easily installed by one operator when the MOC switch is installed.

One aspect of the present invention may be achieved by a high voltage electric switchboard in which a plurality of functional parts including a bus bar part (so-called bus compartment), a measurement and supervisory controller (so-called low voltage part or LV compartment), a circuit breaker part, a wire part, and potential transformer part (so-called PT part) are independently modularized such that the functional parts do not have a shared surface with each other and at least two outer surfaces of an enclosure of each of the modularized functional parts is installed to be in contact with an outer surface of an enclosure of another functional part adjacent in a horizontal direction or a vertical direction.

Another aspect of the present invention may be achieved by a high voltage electric switchboard including a MOC switch installed by a fixing part fastened from top to bottom and outputting an electrical signal indicating a position of a draw-out circuit breaker.

According to a preferred aspect of the present invention, the plurality of functional parts may be stacked in three layers, and each of two different functional parts may be installed at the front and rear positions on each layer.

According to another preferred aspect of the present invention, the high voltage electric switchboard may further include a lower base plate supporting the plurality of functional parts from below and an upper cover covering the high voltage electric switchboard from above.

According to another preferred aspect of the present invention, two of the plurality of functional parts may be loaded on an upper portion of the lower base plate, and the two functional parts may be fixed to the lower base plate by a coupling bolt.

According to still another preferred aspect of the present invention, the plurality of functional parts may have a plurality of through holes allowing a fastening part for coupling with the lower base plate or the upper cover or other adjacent functional part to pass therethrough.

According to another preferred aspect of the present invention, the circuit breaker part may include a draw-out circuit breaker movable to a connected position at which the draw-out circuit breaker is electrically connected to a rear terminal part, a disconnected position at which the draw-out circuit breaker is electrically separated from the terminal part, and a test position, a base plate providing a bottom surface on which the draw-out circuit breaker moves, and an MOC switch installed by a fixing part which is fastened from top to bottom at a predetermined position on an upper surface of the base plate to output an electrical signal indicating a position of the draw-out circuit breaker.

According to another preferred aspect of the present invention, the base plate may have an opening portion for operation of the MOC switch, and the MOC switch may include a pair of supporting brackets having an upper horizontal fixing plate portion having at least one screw fastening hole and a vertical plate portion bent at a right angle and extending from the upper horizontal fixing plate portion so as to be fixed to an upper surface of the substrate around the opening portion.

According to another preferred aspect of the present invention, the MOC switch may include at least two MOC switches installed by fixing parts fastened from top to bottom at predetermined positions on an upper surface of the base plate corresponding to the connected position and the disconnected position and outputting an electrical signal indicating a position of the drawn-out circuit breaker, and the opening portion may be provided by at least two in number to correspond to the two MOC switches.

Since the high voltage electric switchboard is configured such that the plurality of functional parts including the bus bar part, the measurement and supervisory controller, the circuit breaker part, a wire part, and potential transformer part are independently modularized so that the functional parts do not have a shared surface with each other and at least two outer surfaces of the enclosure of each of the modularized functional parts are installed to be in contact with the outer surface of an enclosure of another functional part adjacent in a horizontal direction or a vertical direction, the plurality of functional parts may be manufactured in parallel to improve manufacturing productivity, and if a functional part has a fault, only the corresponding functional part may be separated and replaced or repaired to obtain simple maintenance, and a size of the high voltage electric switchboard may be reduced.

Since the high voltage electric switchboard according to the present invention includes the MOC switch installed by the fixing part fastened from top to bottom, when the high voltage electric switchboard is manufactured or repaired, installation and separation of the MOC switch may be easily performed by one operator.

In the high voltage electric switchboard according to the present invention, since the plurality of functional parts are stacked in three layers and each of two different functional parts may be installed at the front and rear positions on each layer, the high voltage electric switchboard may be configured by stacking the six functional parts configured as independent modules without a shared surface in three layers by twos.

Since the high voltage electric switchboard according to the present invention further includes the lower base plate supporting the plurality of functional parts from below and the upper cover covering the high voltage electric switchboard from above, the lowermost functional parts may be fixed and supported on the lower base plate and the uppermost functional parts may be covered by the upper cover so as to be protected from an external impact.

In the high voltage electric switchboard according to the present invention, two of the plurality of functional parts are loaded on an upper portion of the lower base plate and fixed to the lower base plate by a coupling bolt.

In the high voltage electric switchboard according to the present invention, since the plurality of functional parts have the plurality of through holes allowing the fastening part for coupling with the lower base plate or the upper cover or other adjacent functional parts to pass therethrough, a screw portion of a coupling bolt can be screwed to a pop nut in a state where the pop nut is installed in a corresponding through hole portion of one side, whereby the plurality of functional parts may be configured as one assembly.

In the high voltage electric switchboard according to the present invention, since the circuit breaker part includes the draw-out circuit breaker, the base plate, and the MOC switch provided on the upper surface of the base plate, the draw-out circuit breaker may be moved on the base plate in the circuit breaker part and a position thereof may be detected by the MOC switch.

In the high voltage electric switchboard according to the present invention, since the base plate has the opening portion for operation of the MOC switch and the MOC switch includes the pair of supporting brackets having the upper horizontal fixing plate portion having at least one screw fastening hole and the vertical plate portion bent at a right angle and extending from the upper horizontal fixing plate portion so as to be fixed to the peripheral base plate upper surface of the opening portion, the upper horizontal fixing plate portion of the pair of supporting rackets may be fixed by fastening a fastening part such as a coupling bolt to the peripheral base plate upper surface of the opening portion from top to bottom, the vertical plate portion may be fastened to the side of the MOC switch so as to be coupled to the MOC switch and supported, and installation and separation of the MOC switch may be easily performed by one operator when the high voltage electric switchboard is manufactured or repaired.

In the high voltage electric switchboard according to the present invention, since the MOC switch includes at least two MOC switches installed by the fixing part fastened from top to bottom at the predetermined position on the upper surface of the base plate corresponding to the connected position and the disconnected position and outputting an electrical signal indicating a position of the drawn-out circuit breaker and two opening portions corresponding to the two MOC switches are provided, when the two MOC switches are a connected position detection switch and a disconnected position detection switch, a controller may determine that the circuit breaker main body is positioned at a corresponding position if a position detection signal is sent from any one of the two MOC switches, and may determine that the circuit breaker main body is positioned at the test position if a position detection signal is not sent from any one of the two MOC switches.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings:

FIG. 6 is an assembly process diagram illustrating a process of loading and assembling a circuit breaker part on a potential transformer part in a state where the potential transformer part is installed on a lower base plate;

FIG. 7 is an assembly process diagram illustrating a process of mounting a measurement and supervisory controller on an assembly of a lower base plate, a potential transformer part, and a circuit breaker part;

FIG. 8 is an assembly process diagram illustrating a process of further assembling a wire part to an assembly of a lower base plate, a potential transformer part, a circuit breaker part, and a measurement and supervisory controller;

FIG. 9 is an assembly process diagram illustrating a process of further assembling a current transformer part to an assembly of a lower base plate, a potential transformer part, a circuit breaker part, a measurement and supervisory controller, and a wire part;

FIG. 10 is an assembly process diagram showing a process of further assembling a bus bar part to an assembly of a lower base plate, a potential transformer part, a circuit breaker part, a measurement and supervisory controller, a wire part, and a current transformer part;

FIG. 11 is an assembly process diagram illustrating a process of completing assembling of functional parts of a high voltage electric switchboard according to the present invention by finally covering and coupling an upper cover to the assembly of FIG. 10;

DETAILED DESCRIPTION OF THE DISCLOSURE

Description will now be given in detail of the embodiments, with reference to the accompanying drawings. For the sake of brief description with reference to the drawings, the same or equivalent components will be provided with the same reference numbers, and description thereof will not be repeated.

First, a configuration of a high voltage electric switchboard according to the present invention will be described with reference to FIG. 4, which is an exploded side view showing disassembled functional parts constituting the high voltage electric switchboard according to the present invention.

Figure 1:
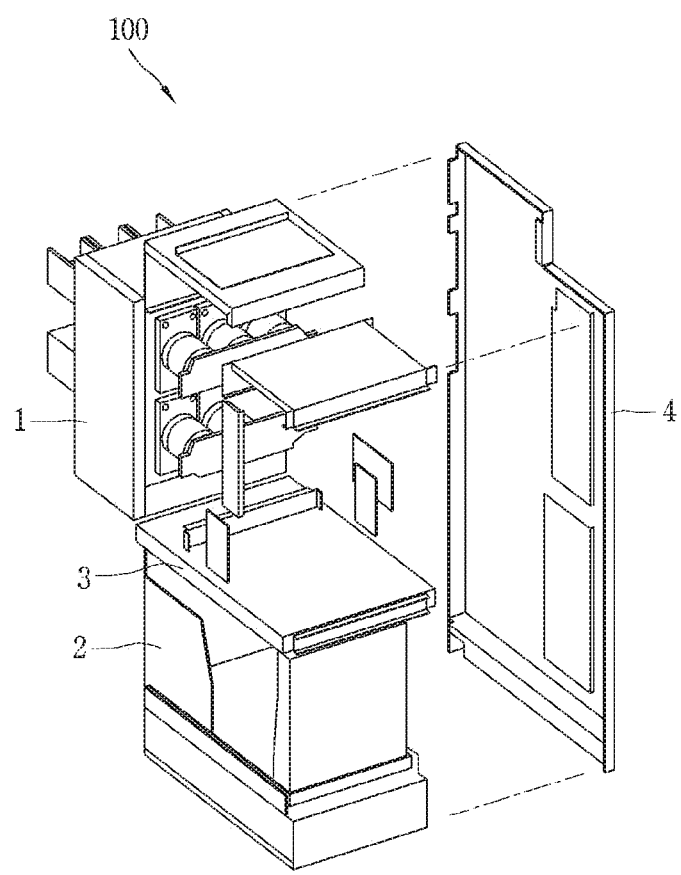
FIG. 1 is a perspective view showing a characteristic configuration of a high voltage electric switchboard according to the related art, which shows a circuit breaker part, a potential transformer part, an intermediate diaphragm and a disassembled one side plate.
Figure 2:
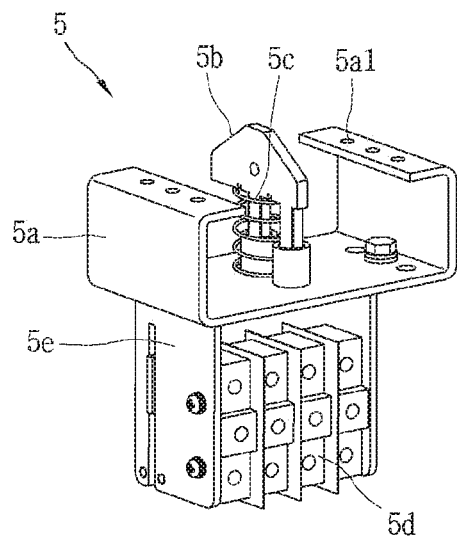
FIG. 2 is a front perspective view of a mechanism operated cell (MOC) switch in a high voltage electric switchboard according to the related art.
Figure 3:
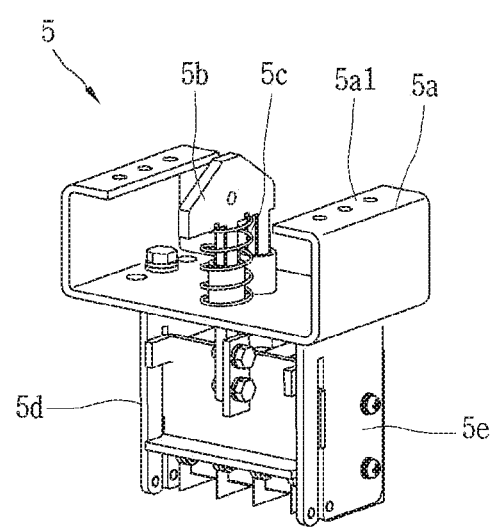
FIG. 3 is a rear perspective view of a MOC switch in a high voltage electric switchboard according to the related art.
Figure 4:
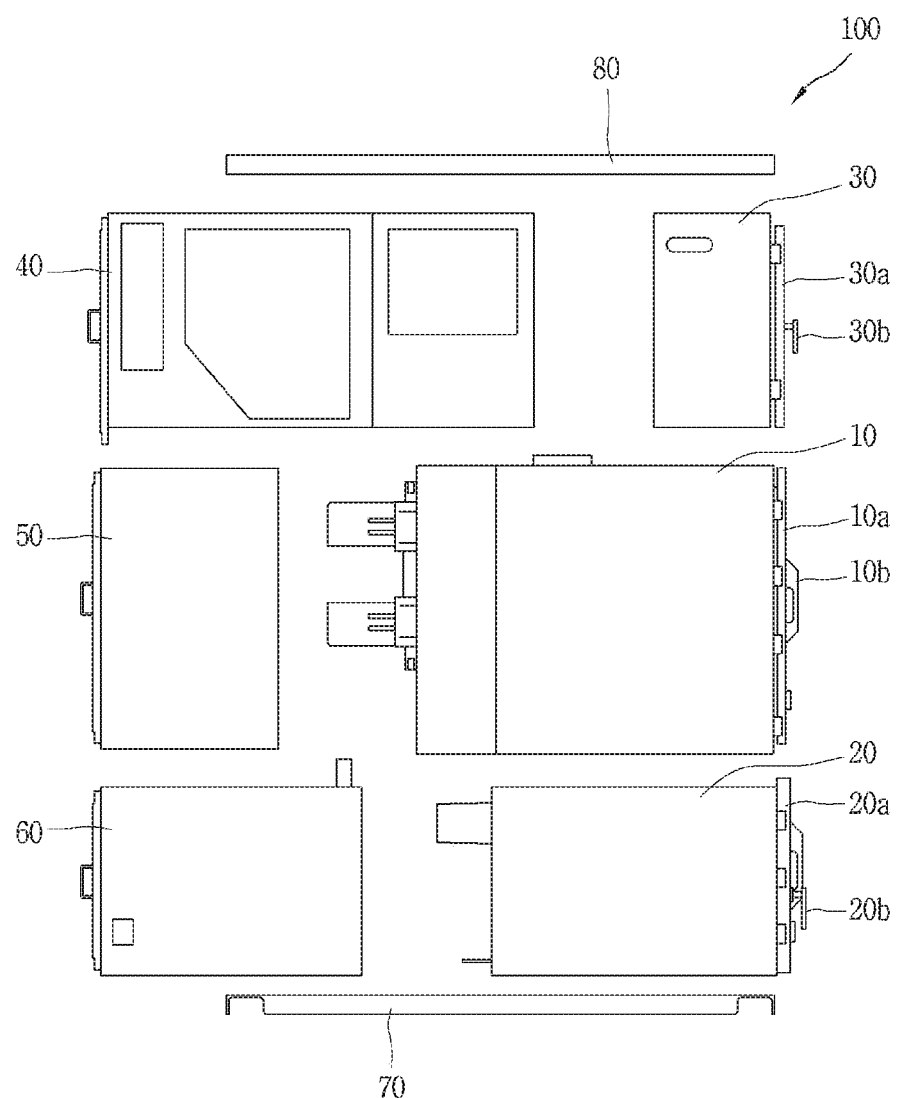
FIG. 4 is an exploded side view showing a disassembled state of functional parts constituting a high voltage electric switchboard according to the present invention.

Referring to FIG. 4, a high voltage electric switchboard 100 according to an embodiment of the present invention includes a plurality of modules, that is, a plurality of functional parts 10, 20, 30, 40, 50, and 60.

The plurality of functional parts 10, 20, 30, 40, 50, and 60 are a bus bar part (or bus compartment) 40, a measurement and supervisory controller (or LV compartment) 30, a circuit breaker part 10, a wire part 60, and a potential transformer part (or PT compartment) 20, and may further include a current transformer part (or CT compartment) 50.

The configuration example of the high voltage electric switchboard 100 is a configuration example of one embodiment. For example, there may be a modified embodiment including greater or fewer functional parts than the six functional parts described above.

Unlike the related art described above, the plurality of functional parts 10, 20, 30, 40, 50, and 60 of the high voltage electric switchboard 100 according to the present invention are independently modularized such that the functional parts do not have a shared surface with each other.

In other words, in the high voltage electric switchboard 100 according to the present invention, the plurality of functional parts 10, 20, 30, 40, 50, and 60 are configured as independent modules which may have a surface in contact with each other but do not a surface shared with each other.

Figure 11:
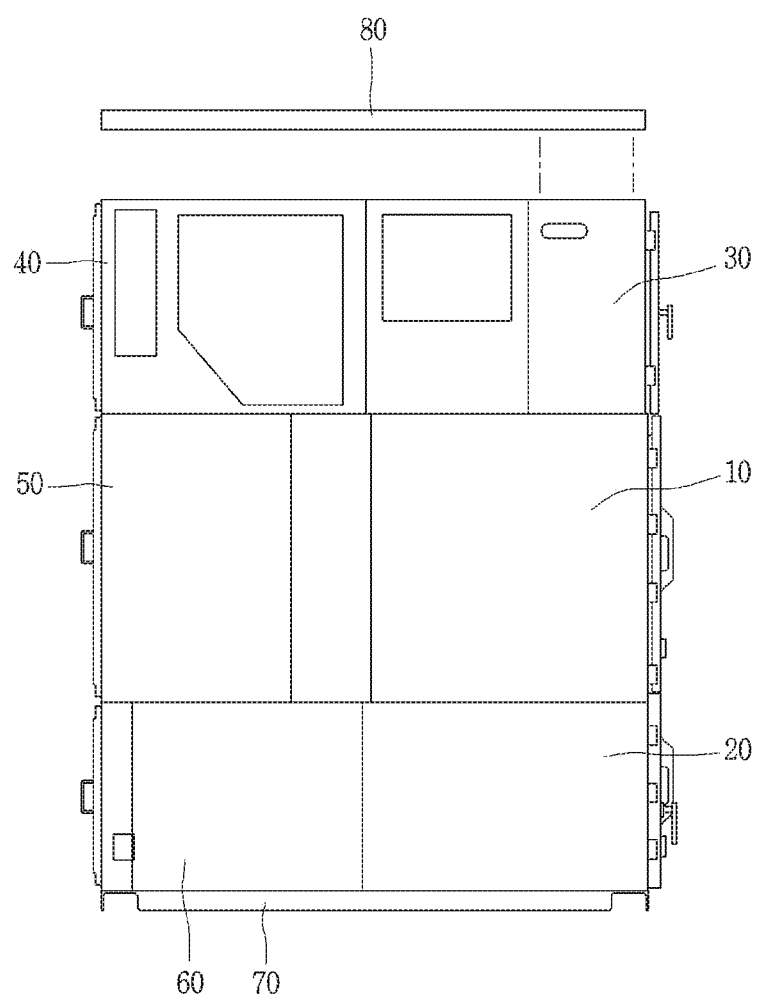

As can be seen in FIG. 11, at least two outer surfaces of an enclosure of each of the modularized functionalized parts 10, 20, 30, 40, 50, and 60 are installed to be in contact with an outer surface of an enclosure of another functional part adjacent in a horizontal direction or vertical direction.

For example, a contact relationship of one functional part with another neighboring functional part in each of three layers will be described.

In the uppermost layer (third layer), a front surface of an enclosure of the bus bar part 40 may be in contact with a rear surface of an enclosure of the measurement and supervisory controller 30 on a front side (right side in the drawing) in the horizontal direction, and a lower surface of the enclosure of the bus bar part 40 may be in contact with an upper surface of an enclosure of the current transformer part 50 on a lower side (lower side in the drawing) in the vertical direction. The lower surface of the enclosure of the bus bar part 40 may be connected by a fastening unit such as a pop nut and a coupling bolt with the upper surface of the enclosure of the current transformer part 50 on the lower side (lower side in the drawing) in the vertical direction.

In a middle layer (second layer), the upper surface of the enclosure of the current transformer part 50 is in contact with the lower surface of the enclosure of the bus bar part 40 upward in the vertical direction, and a front surface of the enclosure of the current transformer part 50 is in contact with a rear surface of an enclosure of the circuit breaker part 10 on the front (right side in the drawing) in the horizontal direction, and a lower surface of the enclosure of the current transformer part 50 is in contact with an upper surface of an enclosure of the wire part 60 on a lower side (lower side in the drawing) in the vertical direction. The lower surface of the enclosure of the current transformer part 50 may be connected with the upper surface of the enclosure of the wire part 60 on the lower side by a fastening unit such as a pop nut and a coupling bolt in the vertical direction.

In the lowermost layer (first layer), a rear surface of an enclosure of the potential transformer part 20 is in contact with a front surface of the enclosure of the wire part 60 on the rear side (left side in the drawing) in the horizontal direction, and the upper surface of the enclosure of the potential transformer part 20 is in contact with the lower surface of the enclosure of the circuit breaker part 10 on the upper side in the vertical direction. The upper surface of the enclosure of the potential transformer part 20 may be connected to the upper surface of the enclosure of the circuit breaker part 10 on the upper side by a fastening unit such as a pop nut and a coupling bolt in the vertical direction.

As can be seen in FIG. 11, the plurality of functional parts 10, 20, 30, 40, 50, and 60 are stacked in three layers, and two different functional parts are installed at front and rear positions in each layer.

The high voltage electric switchboard 100 according to the present invention may further include a lower base plate 70 supporting the plurality of functional parts 10, 20, 30, 40, 50, and 60 from below and an upper cover 80 covering the high voltage electric switchboard 100 from above.

As can be seen in FIG. 11, according to a preferred aspect of the present invention, two of the plurality of functional parts (10, 20, 30, 40, 50, and 60), that is, the wire part 60 and the potential transformer part 20 is mounted on the lower base plate 70, and the wire part 60 and the potential transformer part 20 are fixed to the lower base plate 70 by coupling bolts.

The plurality of functional parts 10, 20, 30, 40, 50, and 60 may have a plurality of through holes allowing fastening units to pass therethrough so as to be coupled with the lower base plate 70, the upper cover 80, or another neighboring function part.

Figure 5:
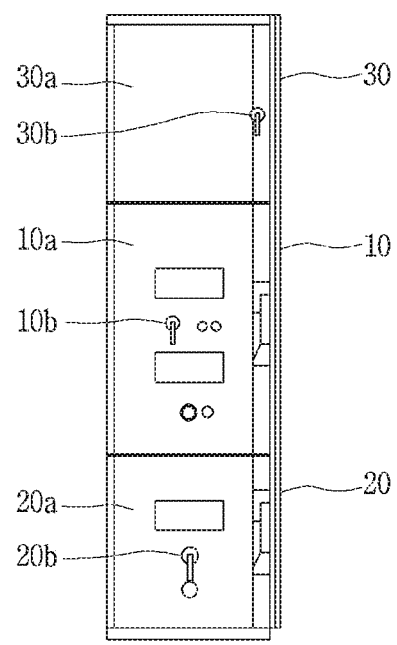
FIG. 5 is a front view of an assembled state of a high voltage electric switchboard according to the present invention.

As can be seen in FIG. 5, the circuit breaker part 10 is disposed on the front of the second layer of the high voltage electric switchboard 100 according to the present invention, so that the circuit breaker part 10 may include a front door 10a and a handle 10b for opening and closing the front door 10a.

Figure 16:
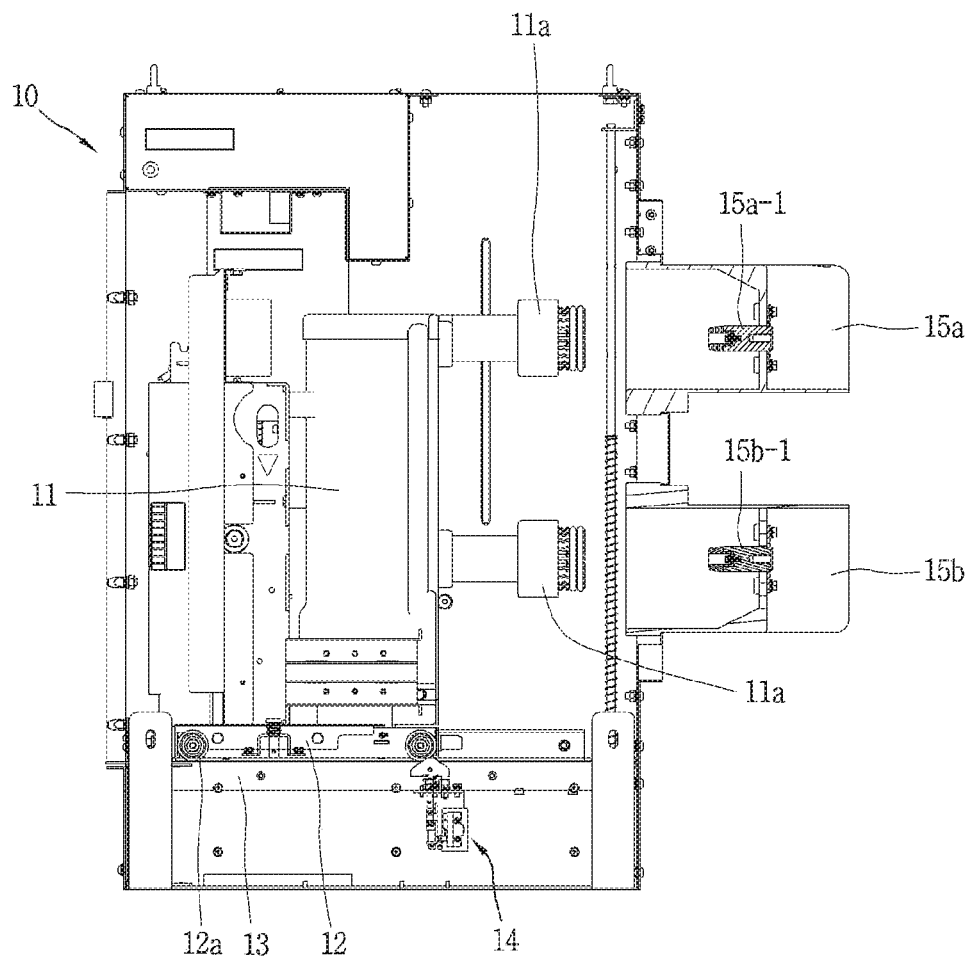
FIG. 16 is a longitudinal cross-sectional view showing a detailed configuration of a circuit breaker part in a high voltage electric switchboard according to the present invention.

As shown in FIG. 16, the circuit breaker part 10 includes a draw-out circuit breaker 11, a base plate 13, and a mechanism operated cell (MOC) switch 14.

In FIG. 16, reference numeral 12 indicates a transfer cart capable of loading and moving a circuit breaker main body of the draw-out circuit breaker 11, reference numeral 12a indicates a wheel of the transfer cart 12, reference numeral 11a indicates a circuit breaker main body side terminal and includes three power supply side terminals (for example, three upper terminals) and three load side (e.g., three lower terminals), reference numerals 15a and 15b may indicate enclosure side terminals provided on the enclosure side of the circuit breaker for connection to a three-phase bus (power supply side) and similarly include three power supply side terminals (for example, three upper terminals) and three load side terminals (for example, three lower terminals), and reference numerals 15a-1 and 15b-1 indicate main body connection terminals that may be connected to the circuit breaker main body side terminal 11a of the enclosure side terminals 15a and 15b.

The draw-out circuit breaker 11 may refer to a breaker main body in a narrow sense and may be moved to a connected position at which the draw-out circuit breaker 11 is mounted on the transfer cart 12 and electrically connected to a rear terminal part, that is, the main body connection terminals 15a-1 and 15b-1, a test position at which the draw-out circuit breaker 11 is electrically separated from the main body connection terminals 15a-1 and 15b-1 and connected to a control power source (not shown), and a disconnected position at which the draw-out circuit breaker 11 is electrically separated from the main body connection terminals 15a-1 and 15b-1 and separated from the control power source.

The base plate 13 is disposed at a lower portion of the circuit breaker part 10 to provide a bottom surface and support surface on which the draw-out circuit breaker 11 may move. According to an embodiment, a guide rail (not shown) may be installed on the base plate 13 to guide a forward and backward movement of the draw-out circuit breaker 11.

Figure 14:
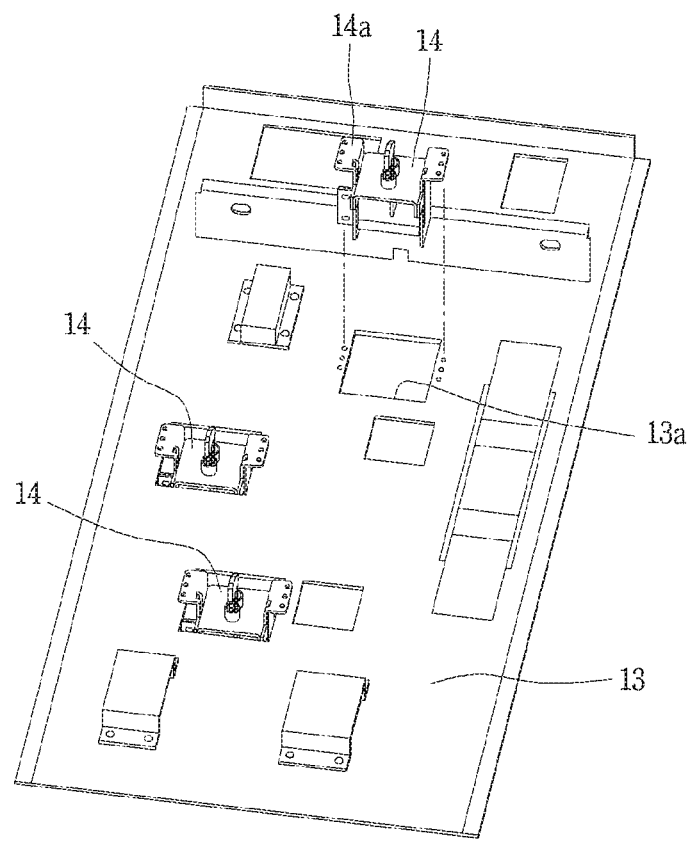
FIG. 14 is a perspective view of a base plate and a MOC switch showing a MOC switch installed on a base plate of a circuit breaker part in a high voltage electric switchboard according to the present invention.

As can be seen in FIG. 14, the base plate 13 has an opening portion 13a for an operation of the MOC switch 14. According to a preferred embodiment, the opening portion 13a is formed in a quadrangular shape corresponding to a quadrangle having a cross-sectional shape of the MOC switch 14. A length of the opening portion 13a, that is, a horizontal length in FIG. 14, is formed to be smaller than a distance between free ends of the both supporting brackets 14a (to be described later) of the MOC switch 14, and three fastening holes allowing coupling of a fastening unit are provided on the left and right sides and are provided to fix the supporting bracket 14a as illustrated by a fastening unit such as a bolt, a screw, or the like according to an embodiment.

According to an embodiment, two opening portions 13a may be provided to correspond to two MOC switches 14 installed to correspond to the connected position and the disconnected position.

According to another embodiment shown in FIG. 14, three opening portions 13a may be provided to correspond to three MOC switches 14 installed at three positions of the connected position, the test position, and the disconnected position of the draw-out circuit breaker 11.

Figure 15:
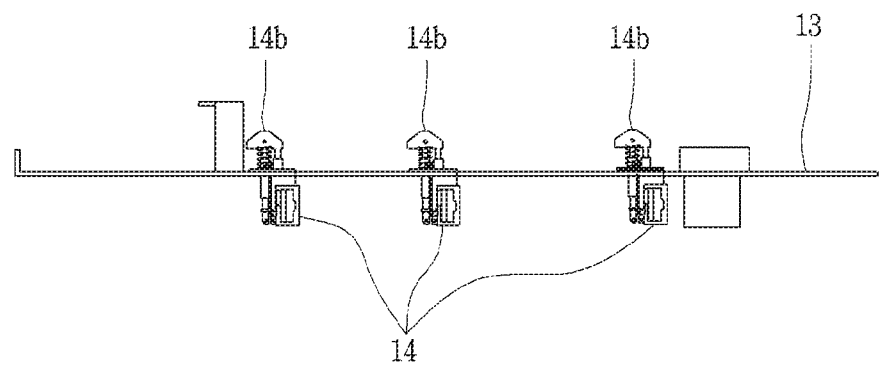
FIG. 15 is a side view of a base plate and a MOC switch showing a MOC switch installed on a base plate of a circuit breaker part in a high voltage electric switchboard according to the present invention.

As can be seen from FIG. 14 or 15, the MOC switch 14 may be provided at a predetermined position (for example, the connected position and the disconnected position) on an upper surface of the base plate 13 by a fastening unit fastened from top to bottom and outputs an electrical signal indicating a position of the draw-out circuit breaker.

The MOC switch 14 is provided on a fastening unit (for example, a coupling bolt or a fastening screw) fastened from top to bottom at a predetermined position on the upper surface of the base plate 13 corresponding to the connected position and the disconnected position. Two MOC switches outputting an electrical signal indicating the position of the draw-out circuit breaker 11 may be included according to an embodiment.

As can be seen in FIG. 14 or 15, the MOC switch 14 may include three MOC switches installed at predetermined positions on the upper surface of the base plate 13 corresponding to the connected position, the disconnected position and the test position by a fixing unit (for example, a coupling bolt or a fastening screw) fastened from top to bottom and outputting an electrical signal indicating the position of the draw-out circuit breaker 11.

A detailed configuration of the MOC switch 14 of the high voltage electric switchboard 100 according to the present invention will be described with reference to FIGS. 12 and 13.

Figure 12:
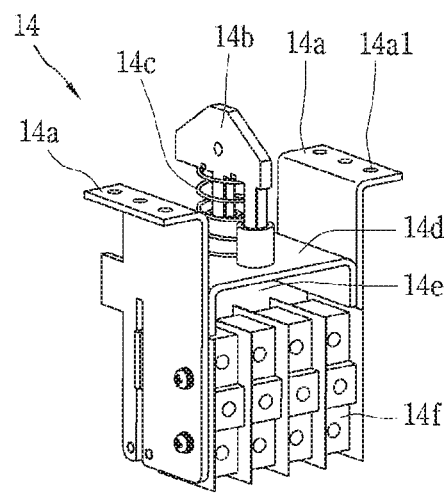
FIG. 12 is a front perspective view showing a configuration of a MOC switch installed in the circuit breaker part of a high voltage electric switchboard according to the present invention.
Figure 13:
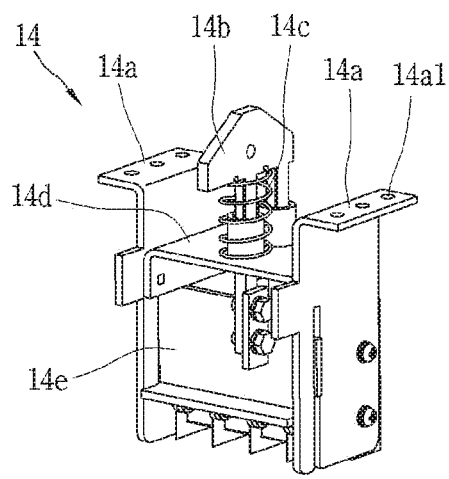
FIG. 13 is a rear perspective view showing a configuration of a MOC switch installed in a circuit breaker part of a high voltage electric switchboard according to the present invention.

As can be seen from FIGS. 12 and 13, the MOC switch 14 of the high voltage electric switchboard 100 according to the present invention includes a pair of supporting brackets 14a, one power receiving plate portion 14b, one return spring 14c, one upper supporting plate 14d, one switch operating plate 14e, and a plurality of micro-switches 14f.

The pair of supporting brackets 14a may be formed of metal plates each having an "L" shape. Each supporting bracket 14a includes an upper horizontal fixing plate portion having at least one screw fastening hole (three in the illustrated embodiment) 14a1 and a vertical plate portion bent at a right angle and extending from the upper horizontal fixing plate portion so as to be fixed to a peripheral base plate upper surface of the opening 13a in the base plate 13.

The pair of supporting brackets 14a are units for fixing the MOC switch 14 to a predetermined position on the upper surface of the base plate 13 and supporting the MOC switch 14 at the same time.

One power receiving plate portion 14b may be configured to include one head portion and two leg portions.

The one head portion of the power receiving plate portion 14b may be configured to have two inclined surfaces and a pointed tip portion in the same shape as a head portion of an arrow.

The one head portion of the power receiving plate portion 14b may be installed in the transfer cart 12 of the draw-out circuit breaker 11 and receive power for pressing downward from a striker (not shown) provided to generate a pressing force downward.

One of the two leg portions of the power receiving plate portion 14b is connected with the switch operating plate 14e for power transmission, and the other is provided for balanced lifting and lowering to prevent the power receiving plate portion 14 from being lifted and lowered in an inclined state, and extend from one lower side of the head portion.

One return spring 14c is installed near one of the two leg portions of the power receiving plate portion 14b, which is provided for the balanced lifting and lowering, and in particular, one end portion is supported by the bottom of the head portion of the power receiving plate portion 14b and the other end is supported by the upper supporting plate 14d.

The return spring 14c is configured as a compression coil spring, and when there is power for pushing down from the striker (not shown) in the transfer cart 12 that pushes down the power receiving plate portion 14b, the return spring 14c is compressed to charge elastic energy.

When there is no power pressing down from the striker (not shown) in the transfer cart 12 which pushes down the power receiving plate portion 14b, the return spring 14c radiates elastic energy to lift the power receiving plate portion 14b. As the switch operating plate 14e connected to the power receiving plate portion 14b is also lifted, an operating lever part of the plurality of micro-switches 14f is released and thus output of the electrical signal indicating the position of the draw-out circuit breaker 11 may be stopped.

One upper supporting plate 14d is provided to cross between the pair of supporting brackets 14a.

An upper surface of the upper supporting plate 14d is installed lower than the upper horizontal fixed plate portion of the pair of supporting brackets 14a and is located below the upper portion of the base plate 13 and below the opening portion 13a.

Both end portions of the upper supporting plate 14d in a length direction are bent at 90 degrees downward and coupled to the pair of support brackets 14a by a connection bolt or a connection screw.

A pair of guide tube portions (reference numeral is not given) for guiding lifting and lowering of the two leg portions of the power receiving plate portion 14b are provided to protrude upward by a predetermined length from an upper surface of the upper supporting plate 14d.

One switch operating plate 14e is provided below the upper support plate 14d and between the pair of supporting brackets 14a and lifted and lowered according to whether the one switch operating plate 14e receives pressing power from the power receiving plate portion 14b.

The switch operating plate 14e is configured as a plate whose lower portion is bent forward by 90 degrees, and a lower portion bent forward by 90 degrees is configured to press an operating lever portion of the plurality of micro-switches 14f. That is, the operating lever portion of the plurality of micro-switches 14f includes one leaf spring provided to extend downward slantingly from the micro-switch 14f and a roller provided at an end portion of the corresponding leaf spring to receive power for opening and closing an opening and closing contact inside the micro-switch 14f.

The operating lever portion of the plurality of micro-switches 14f are pressed by a rear surface of a lower portion bent by 90 degrees forward of the descending switch operating plate 14e to operate the opening and closing contact therein.

When the lower portion of the lifted switch operating plate 14e releases the operating lever portion of the plurality of micro-switches 14f, the internal opening and closing contact is operated reversely to when pressed (for example, closed when pressed and opened when released).

The pair of supporting brackets 14a may have a guide slit portion formed to be narrow and long in the vertical direction to guide and support the lifting of the switch operating plate 14e, and a support protrusion portion (reference numeral is not given) is provided on both side surfaces of the switch operating plate 14e so as to be accommodated in the corresponding guide slit portion and lifted therein.

The plurality of micro-switches 14f may be supported and maintained by a long support bolt and nut passing through the plurality of micro-switches 14f and the both supporting brackets 14a between the both supporting brackets 14a.

The plurality of micro-switches 14f may be formed as four micro-switches according to an embodiment. As the plurality of micro-switches 14f are pressed or released by the lower portion of the lifted or lowered switch operating plate 14e, the internal opening and closing contact is opened or closed and a predetermined voltage signal is output or stopped accordingly, thus outputting an electrical signal indicating a position of the draw-out circuit breaker 11.

The potential transformer part 20 may be configured to include a substantially rectangular box-shaped metal enclosure and a transformer part and a power input part and an output part installed in the enclosure.

The potential transformer part 20 may detect a voltage of three-phase power and provide a voltage detection signal and also step down the voltage of the three-phase power to a voltage of a level required by the measurement and supervisory controller 30.

Since the potential transformer part 20 is disposed at the front of the lowermost layer (first layer) of the high voltage electric switchboard 100 according to the present invention, as shown in FIG. 5, the potential transformer part 20 may include a front door 20a and a handle 20b for opening and closing the front door 20a.

The measurement and supervisory controller 30 may be connected to the potential transformer part 20 and the current transformer part 50 to receive a voltage detection signal and a current detection signal therefrom, and the voltage detection signal and the current detection signal may provide information on a voltage and a current of a power circuit connected to the high voltage electric switchboard 100 according to the present invention may provide to the measurement and monitored and protected therein to the measurement and supervisory controller 30.

The measurement and supervisory controller 30 may include a substantially rectangular box-shaped metal enclosure and a multifunctional digital power monitoring device (for example, GIPAM, GIMAC manufactured and sold by the present applicant) installed in the enclosure.

The measurement and supervisory controller 30 may perform calculation of power information of the monitoring target power circuit and a control operation such as whether an accidental current such as an overcurrent or a short-circuit current occurs based on the information on the voltage and current of the power circuit received from the potential transformer part 20 and the current transformer part 50, outputting a cutoff control signal (trip control signal) to the circuit breaker part 10, calculating reactive power and a power factor, determining whether an open phase/negative phase occurs, and the like.

Since the measurement and supervisory controller 30 is disposed in front of the uppermost layer (third layer) of the high voltage electric switchboard 100 according to the present invention, as shown in FIG. 5, the measurement and supervisory controller 30 may include a front door 30a and a handle 30b for opening and closing the front door 30a.

In the high voltage electric switchboard 100 according to the present invention, the wire part 60, the current transformer part 50, and the bus bar part 40 disposed at the rear of each layer do not have a front door and a handle for opening and closing the front door.

The bus bar part 40 may include a substantially rectangular box-shaped metal enclosure and a three-phase bus bar providing a supply path for power installed in the enclosure, and an insulator for insulation support.

The three-phase bus bar of the bus bar part 40 may be electrically connected to the power supply side terminal 15a of the enclosure side terminal of the circuit breaker part 10.

The current transformer part 50 may be installed around a branch circuit bus bar for each phase electrically connected to the load side terminal 15b of the enclosure side terminal of the circuit breaker part 10, detect the amount of current flowing in the branch circuit for each phase, and transfer a current detection signal to the measurement and supervisory controller 30.

The wire part 60 is a part into which an external power side wire is drawn and an electric wire for supplying power to an external load side branch circuit is drawn out.

The wire part 60 may be installed inside a grounding conductor for grounding the high voltage electric switchboard 100 according to the present invention.

The wire part 60 includes a substantially rectangular box-shaped metal enclosure and the wires installed in the enclosure.

The external power supply side wire is electrically connected to the three-phase bus bar of the bus bar part 40, and a wire supplying power to the load side branch circuit may be electrically connected to a branch circuit bus bar for each phase electrically connected to the load side terminal 15b in the enclosure side terminal of the circuit breaker part 10.

Meanwhile, an assembly operation and a repairing operation of the high voltage electric switchboard 100 according to the present invention will be described with reference to FIGS. 6 to 11 and 17.

Figure 6:
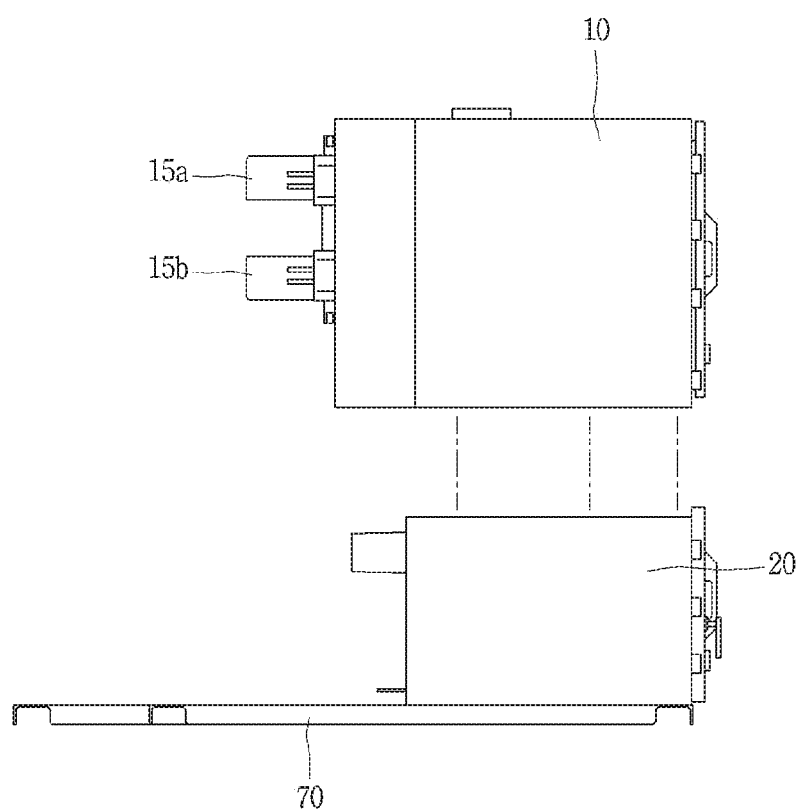
FIGS. 6 to 11 show an assembling process of each functional part of a high voltage electric switchboard according to the present invention.

First, as shown in FIG. 6, the potential transformer part 20 is mounted on the lower base plate 70, and a through hole previously punched to correspond to the through hole portion of the lower base plate 70 on the lower surface of the enclosure of the potential transformer part 20 is aligned to communicate with the through hole portion punched at a predetermined position of the lower base plate 70.

Next, in a state where the through hole portion of the lower base plate 70 and the through hole portion of the lower surface of the enclosure of the potential transformer part 20 are aligned, pop nuts (see reference numeral PN in FIG. 17) are arranged in the plurality of aligned through holes.

Thereafter, an operation of coupling a screw portion of the coupling bolt FB to the pop nut of the lower base plate 70 is repeated a plurality of times.

As a result, an assembly of the lower base plate 70 and the potential transformer part 20 is formed.

Next, as shown in FIG. 6, the circuit breaker part 10 is mounted on the potential transformer part 20 and a plurality of through hole portions punched at a predetermined position on a lower surface of the enclosure of the circuit breaker part 10 and a through hole portion punched at a predetermined position on an upper surface of the enclosure of the potential transformer part 20 are aligned to communicate with each other.

Next, in a state where the through hole portion of the upper surface of the enclosure of the potential transformer part 20 and the through hole portion of the lower surface of the enclosure of the circuit breaker part 10 are aligned, pop nuts (see reference numeral PN of FIG. 17) are installed on the plurality of aligned through hole portions.

Thereafter, the operation of screwing a screw portion of the coupling bolt FB to the pop nuts are repeated a plurality of times. Here, in consideration of securing an insulation distance between the components in preparation for high voltage, high current energization, the components are not densely filled inside the functional parts and a sufficient space is provided, so that there is no difficulty in installing the pop nut and coupling the coupling bolt between the functional parts which are adjacent to each other vertically or forward and backward in the high voltage electric switchboard 100 according to the present invention.

As a result, an assembly of the potential transformer part 20 and the circuit breaker part 10 is formed.

Figure 17:
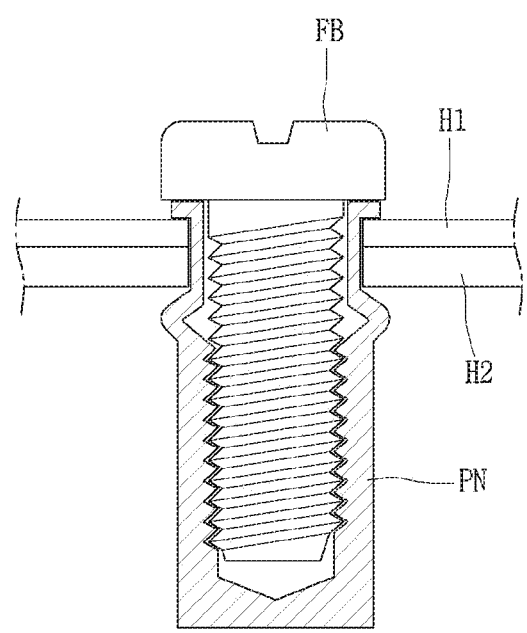
FIG. 17 is a partial perspective view showing a configuration of coupling two adjacent functional parts in a high voltage electric switchboard according to the present invention.

In FIG. 17, reference numeral H1 indicates an enclosure of any one functional part, and reference numeral H2 indicates an enclosure of another functional part adjacent to the functional part H1.

A process of assembling the measurement and supervisory controller 30 on the assembly of the potential transformer part 20 and the circuit breaker part 10 will be described with reference to FIG. 7.

Figure 7:
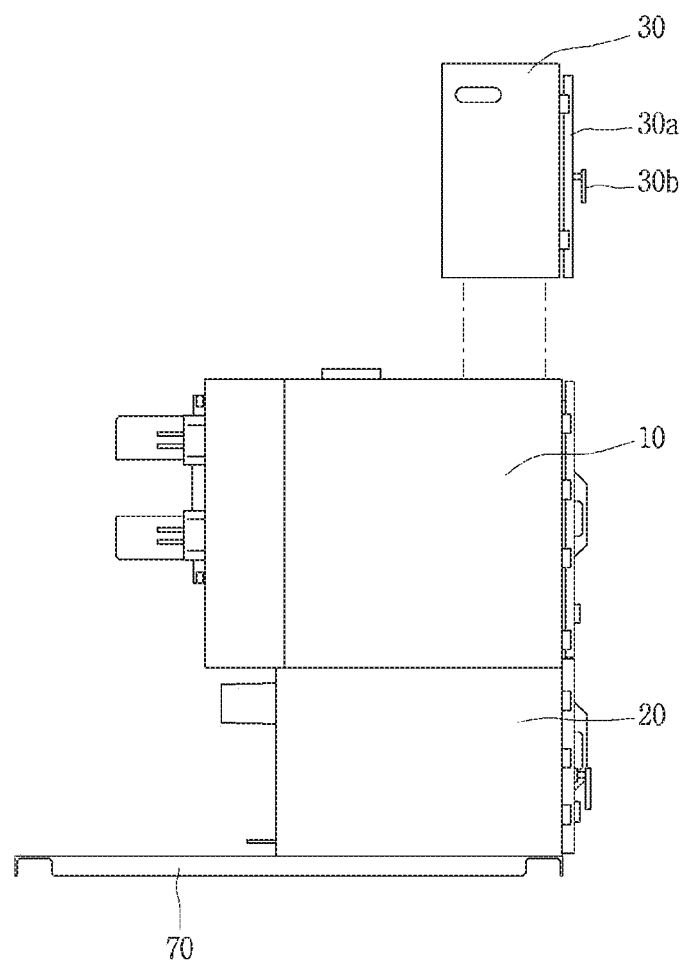

As shown in FIG. 7, a plurality of measurement and supervisory controllers 30 are mounted on the circuit breaker part 10, and a plurality of through hole portions punched at a predetermined position on the lower surface of the enclosure of the measurement and supervisory controller 30 and a through hole portion punched at a predetermined position to correspond to the upper surface of the enclosure of the measurement and supervisory controller 30 are aligned to communicate with each other.

Next, with the through hole portion on the lower surface of the enclosure of the measurement and supervisory controller 30 and the through hole portion on the upper surface of the enclosure of the circuit breaker part 10 are aligned, a pop nut is installed on the plurality of aligned through hole portions (see reference numeral PN in FIG. 17).

Thereafter, the operation of screwing a screw portion of the coupling bolt FB to the pop nut is repeated a plurality of times.

Accordingly, the assembly of the potential transformer part 20, the circuit breaker part 10, and the measurement and supervisory controller 30 is formed.

Figure 8:
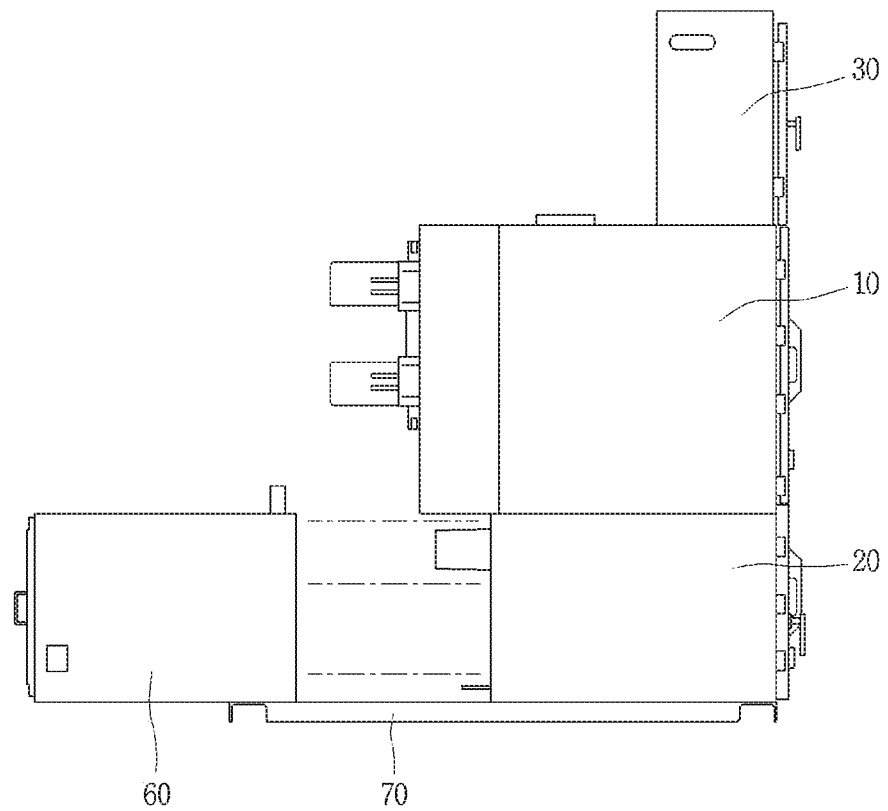

Referring to FIG. 8, a process of assembling the wire part 60 to an assembly of the potential transformer part 20, the circuit breaker part 10, and the measurement and supervisory controller 30 will be described.

Referring to FIG. 8, the wire part 60 is mounted on the rear of the lower base plate 70 and a plurality of through hole portions punched at a predetermined position of a front surface of the enclosure of the wire part 60 and a through hole portion punched at a predetermined position to correspond to the rear surface of the enclosure of the potential transformer part 20 are aligned to communicate with each other.

Next, in a state where the through hole portion on the front surface of the enclosure of the wire part 60 and the through hole portion on the rear surface of the enclosure of the potential transformer part 20 are aligned, a pop nut (see reference symbol PN of FIG. 17).

Thereafter, the operation of screwing a screw portion of the coupling bolt FB to the pop nut is repeated a plurality of times.

Accordingly, an assembly of the potential transformer part 20, the circuit breaker part 10, the measurement and supervisory controller 30, and the wire part 60 is formed.

In this case, the coupling between the lower base plate 70 and the wire part 60 may also be selectively performed by installing a pop nut in the through hole portion and screwing the coupling bolt to the pop nut in the same manner as the coupling method of the lower base plate 70 and the potential transformer part 20 described above.

A process of assembling the current transformer part 50 to the assembly of the potential transformer part 20, the circuit breaker part 10, the measurement and supervisory controller 30, and the wire part 60 will be described with reference to FIG. 9.

Figure 9:
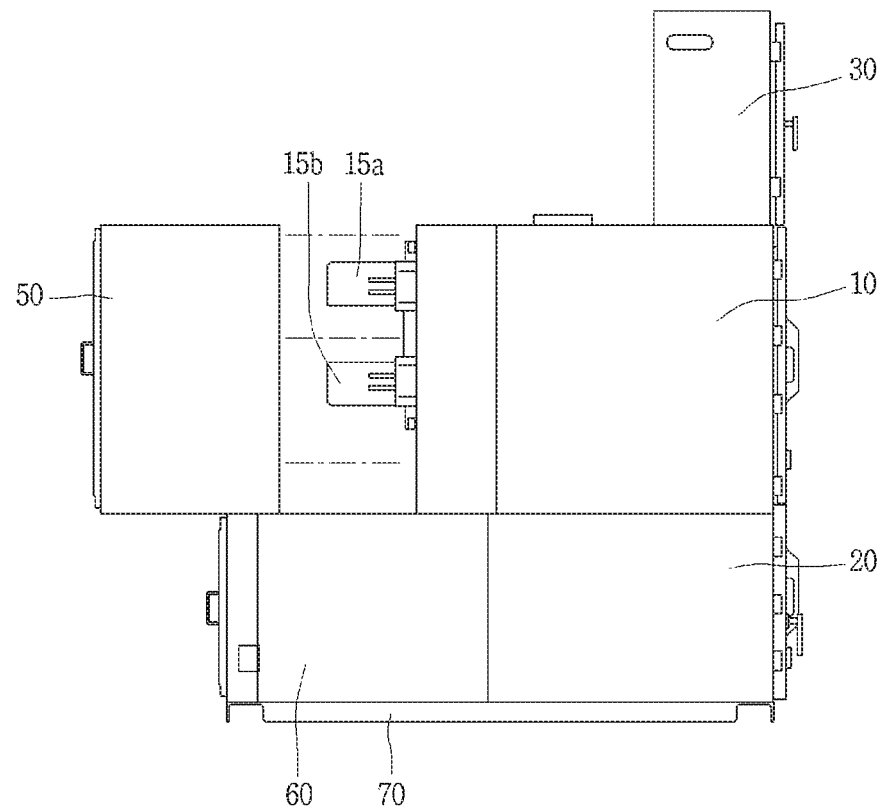

As can be seen in FIG. 9, the current transformer part 50 is mounted on the upper surface of the wire part 60 and behind the circuit breaker part 10, and a plurality of through hole portions punched at a predetermined position of the front surface of the enclosure of the current transformer part 50 and a through hole portion punched at a predetermined position to correspond to the rear surface of the enclosure of the circuit breaker part 10 are aligned to communicate with each other.

Next, in a state where the through hole portion on the front surface of the enclosure of the current transformer part 50 and the through hole portion on the rear surface of the enclosure of the breaker part 10 are aligned, a pop nut (see reference numeral PN in FIG. 17) is installed on the plurality of aligned through hole portions.

Thereafter, the operation of screwing a screw portion of the coupling bolt FB to the pop nut is repeated a plurality of times.

As a result, an assembly of the potential transformer part 20, the circuit breaker part 10, the measurement and supervisory controller 30, the wire part 60, and the current transformer part 50 is formed.

In this case, the coupling between the wire part 60 and the current transformer part 50 may also be selectively performed by installing a pop nut in the through hole portion and screwing the coupling bolt to the pop nut in the same manner as the coupling method of the lower base plate 70 and the potential transformer part 20 described above.

Figure 10:
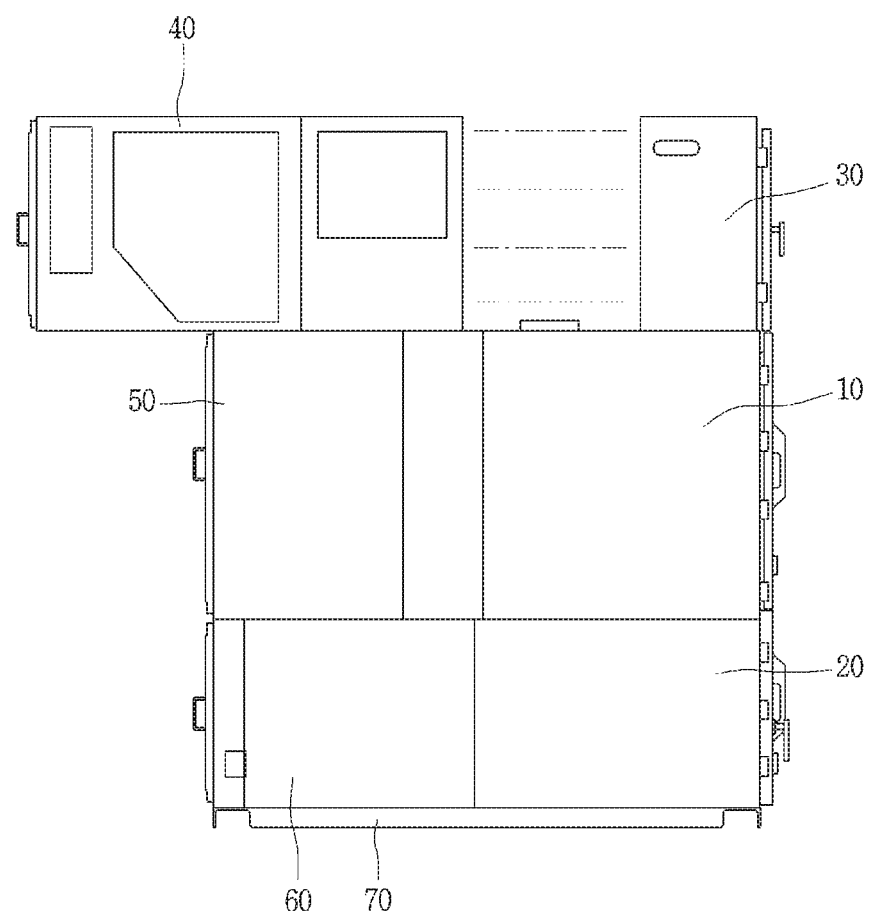

Referring to FIG. 10, a process of assembling the bus bar part 40 to the assembly of the potential transformer part 20, the circuit breaker part 10, the measurement and supervisory controller 30, the wire part 60, and the current transformer part 50 will be described.

As can be seen in FIG. 10, the bus bar part 40 is mounted on the upper surface of the current transformer part 50 and at the rear of the measurement and supervisory controller 30, and a plurality of through hole portions punched at a predetermined position on the front surface of the enclosure of the bus bar part 40 and a through hole portion punched at a predetermined position to correspond to the rear surface of the enclosure of the measurement and supervisory controller 30 are aligned to communicate with each other.

Next, in the state where the through hole portion on the front surface of the enclosure of the bus bar part 40 and the through hole portion of the rear surface of the enclosure of the measurement and supervisory controller 30 are aligned, a pop nut is installed on the plurality of aligned through hole portions. (see reference numeral PN in FIG. 17).

Thereafter, the operation of screwing a screw portion of the coupling bolt FB to the pop nut is repeated a plurality of times.

As a result, an assembly of the potential transformer part 20, the circuit breaker part 10, the measurement and supervisory controller 30, the wire part 60, the current transformer part 50, and the bus bar part 40 is formed.

In this case, the coupling between the bus bar part 40 and the current transformer part 50 may also be selectively performed by installing a pop nut in the through hole portion and screwing the coupling bolt to the pop nut in the same manner as the coupling method of the lower base plate 70 and the potential transformer part 20 described above.

Finally, a process of covering the upper cover 80 on the assembly of the potential transformer part 20, the circuit breaker part 10, the measurement and supervisory controller 30, the wire part 60, the current transformer part 50, and the bus bar part 40 will be described.

A sealing material, such as a sealing tape, is at least partially attached to an upper surface of the bus bar part 40 and the measurement and supervisory controller 30 on the uppermost layer, that is, the third layer.

The through hole portion punched at the predetermined position of the upper surface of the measurement and supervisory controller 30 and the through hole portion punched at the predetermined position to correspond to the upper cover 80 are aligned to communicate with each other and the upper cover 80 covers the upper surface of the bus bar part 40 and the measurement and supervisory controller 30 on the uppermost layer, that is, the third layer.

Next, in a state where the through hole portion of the measurement and supervisory controller 30 and the through hole portion of the upper cover 80 are aligned, a pop nut (see reference numeral PN in FIG. 17) is installed in the plurality of aligned through hole portions.

Thereafter, the operation of screwing a screw portion of the coupling bolt FB to the pop nut is repeated a plurality of times.

Accordingly, the high voltage electric switchboard 100 according to the present invention in which the upper cover 80 covers the assembly of the potential transformer part 20, the circuit breaker part 10, the measurement and supervisory controller 30, the wire part 60, the current transformer part 50, and the bus bar part 40 is completed.

Disassembly of the functional parts for maintenance may be performed in reverse order to the assembly sequence described above.

Meanwhile, an operation of installation and maintenance of the MOC switch in the high voltage electric switchboard 100 according to the present invention will be described with reference to FIGS. 12 to 14.

First, an installation operation of the MOC switch 14 will be described.

Fastening holes near the left and right side of the opening portion 13*a* and the screw fastening hole 14*a*1 of the support bracket 14*a* of the MOC switch 14 are adjusted and two supporting brackets 14*a* are seated near the left and right sides of the opening portion 13*a* in the base plate 13 so as to communicate with three fastening holes formed near each of the left and right sides of the opening portion 13*a* of the base plate 13 in the circuit breaker part 10.

Next, a bolt (not shown) is fastened to the fastening hole near the left and right sides of the opening portion 13*a* and the screw fastening hole 14*a*1 from top to bottom, thereby completing the installation operation of the MOC switch 14. At this time, the MOC switch 14 according to the present invention has a configuration that is installed by screwing from top to bottom unlike the related art, it is possible to perform the installation work by only one operator.

Like the coupling unit between the functional parts described above, after the pop nut is installed in the fastening hole near the left and right sides of the opening portion 13*a* and the screw fastening hole 14*a*1, the coupling bolt may be screwed to the corresponding pop nut from top to bottom to install the MOC switch 14.

Next, a disconnection operation of the MOC switch 14 for a maintenance operation will be described.

If, for example, one of the MOC switches 14 installed in the connected position, the test position, or the disconnect position fails to perform a normal operation, the corresponding MOC switch 14 may need to be removed and replaced with a normal MOC switch 14, or may need to be repaired.

At this time, the MOC switch 14 according to the present invention may be separated from the base plate 13 by disassembling the coupling bolt from above, there is no difficulty in disassembling and one worker may fully perform the work, unlike the MOC switch of the related art.

As described above, since the high voltage electric switchboard is configured such that the plurality of functional parts including the bus bar part, the measurement and supervisory controller, the circuit breaker part, a wire part, and potential transformer part are independently modularized so that the functional parts do not have a shared surface with each other and at least two outer surfaces of the enclosure of each of the modularized functional parts are installed to be in contact with the outer surface of an enclosure of another functional part adjacent in a horizontal direction or a vertical direction, the plurality of functional parts may be manufactured in parallel to improve manufacturing productivity, and if a functional part has a fault, only the corresponding functional part may be separated and replaced or repaired to obtain simple maintenance, and a size of the high voltage electric switchboard may be reduced.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A high voltage electric switchboard in which a plurality of functional parts including a circuit breaker part are modularized to be installed,
wherein the circuit breaker part comprises:

a draw-out circuit breaker movable to a connected position at which the draw-out circuit breaker is electrically connected to a rear terminal part, a disconnected position at which the draw-out circuit breaker is electrically separated from the terminal part, and a test position;

a base plate providing a bottom surface on which the draw-out circuit breaker moves; and at least one mechanism operated cell (MOC) switch inserted into at least one opening portion formed in the base plate and installed by a fastening unit which is fastened downwardly at a predetermined position on an upper surface of the base plate to output an electrical signal indicating a position of the draw-out circuit breaker, wherein the at least one MOC switch comprises a pair of supporting brackets having a vertical plate portion and an upper horizontal fixing plate portion that extends outwardly from a top side of the vertical plate portion, wherein the upper horizontal fixing plate portion is positioned on the upper surface of the base plate, wherein the vertical plate portion is inserted into the opening portion of the base plate, wherein the fastening unit is fastened on the upper horizontal fixing plate portion, wherein an upper supporting plate is provided to cross between the pair of supporting brackets, wherein an upper surface of the upper supporting plate is installed lower than the upper horizontal fixing plate portion of the pair of supporting brackets and is located below the upper surface of the base plate and below the opening portion, wherein a power receiving plate portion protruding from the upper supporting plate upwardly is positioned between the pair of supporting brackets, wherein the plurality of functional parts is independently modularized such that the plurality of functional parts do not have a shared surface with each other, wherein at least two outer surfaces of each of the plurality of functional parts are installed to be in contact with an outer surface of another functional part adjacent in a horizontal direction or a vertical direction.

2. The high voltage electric switchboard of claim 1, wherein the at least one MOC switch comprises at least two MOC switches installed by fixing parts fastened from top to bottom at predetermined positions on the upper surface of the base plate corresponding to the connected position and the disconnected position and outputting an electrical signal indicating a position of the draw-out circuit breaker, and the at least one opening portion comprises at least two opening portions to correspond to the at least two MOC switches.

* * * * *